US012010961B2

(12) United States Patent
MacKenzie

(10) Patent No.: US 12,010,961 B2
(45) Date of Patent: Jun. 18, 2024

(54) MODULAR PLANTING SYSTEM FOR ROOF APPLICATIONS

(71) Applicant: Hortech, Inc., Nunica, MI (US)

(72) Inventor: David S. MacKenzie, Nunica, MI (US)

(73) Assignee: Hortech, Inc., Nunica, MI (US)

(*) Notice: Subject to any disclaimer, the term of this patent is extended or adjusted under 35 U.S.C. 154(b) by 92 days.

(21) Appl. No.: 17/652,206

(22) Filed: Feb. 23, 2022

(65) Prior Publication Data

US 2022/0279729 A1     Sep. 8, 2022

Related U.S. Application Data

(60) Provisional application No. 63/155,556, filed on Mar. 2, 2021.

(51) Int. Cl.
| | |
|---|---|
| *A01G 9/033* | (2018.01) |
| *A01G 9/02* | (2018.01) |
| *A01G 9/029* | (2018.01) |
| *A01G 9/04* | (2006.01) |
| *A01G 27/04* | (2006.01) |

(52) U.S. Cl.
CPC ............. *A01G 9/027* (2013.01); *A01G 9/028* (2013.01); *A01G 9/0293* (2018.02); *A01G 9/0295* (2018.02); *A01G 9/0297* (2018.02); *A01G 9/045* (2013.01)

(58) Field of Classification Search
CPC ........ A01G 27/00; A01G 27/04; A01G 27/06; A01G 2009/003; A01G 9/02; A01G 9/033; A01G 9/025; A01G 9/028
See application file for complete search history.

(56) References Cited

U.S. PATENT DOCUMENTS

| | | | |
|---|---|---|---|
| 84,002 | A | 11/1868 | Ryder |
| 1,070,375 | A | 8/1913 | Reyam et al. |
| 1,557,712 | A | 10/1925 | Wilber |
| 1,637,567 | A | 8/1927 | Herrick |
| 1,665,124 | A | 4/1928 | Wright |
| 2,423,724 | A | 7/1947 | Paxton |
| 2,567,706 | A | 9/1951 | Hannum et al. |

(Continued)

FOREIGN PATENT DOCUMENTS

| | | |
|---|---|---|
| DE | 3535448 | 4/1987 |
| DE | 3712867 | 11/1988 |

(Continued)

*Primary Examiner* — Kristen C Hayes
(74) *Attorney, Agent, or Firm* — Price Heneveld LLP

(57) ABSTRACT

A green roof planter module includes a planter including a bottom wall and a plurality of side walls that cooperate with one another to define an interior space configured to receive an aggregate and plant matter therein, the bottom wall including at least one aperture extending therethrough, a basin including a bottom wall and a plurality of side walls, wherein the bottom wall of the basin and the side walls of the basin cooperate to define a fluid retention space, wherein the planter is supported above the basin, and a fluid wicking member providing fluid communication from the fluid retention space of the basin to the at least one aperture of the bottom wall of the planter, such that the fluid wicking member is configured to transfer fluid from the fluid retention space of the basin to the aggregate and plant matter located with the interior space of the planter.

20 Claims, 6 Drawing Sheets

(56) References Cited

U.S. PATENT DOCUMENTS

| | | | |
|---|---|---|---|
| 2,655,283 A | 10/1953 | Moldt | |
| 2,827,217 A | 3/1958 | Clement | |
| 2,949,699 A | 8/1960 | Charles et al. | |
| 3,299,601 A | 1/1967 | Chiville | |
| 3,386,608 A | 6/1968 | Diller | |
| 3,605,366 A | 9/1971 | Zakim | |
| 3,651,976 A | 3/1972 | Chadbourne | |
| 3,827,818 A | 8/1974 | Ruyters | |
| 3,891,335 A | 6/1975 | Feil | |
| 3,947,995 A | 4/1976 | Renfro | |
| 3,950,908 A | 4/1976 | Van Eyk | |
| 4,058,930 A | 11/1977 | Miles | |
| 4,111,585 A | 9/1978 | Mascaro | |
| 4,111,892 A | 9/1978 | Kamada et al. | |
| 4,118,892 A | 10/1978 | Nakamura et al. | |
| 4,287,682 A * | 9/1981 | Browne | A01G 27/04 47/72 |
| 4,453,359 A | 6/1984 | Robinson | |
| 4,655,018 A | 4/1987 | Pardo | |
| 4,674,245 A | 6/1987 | Turner | |
| 4,926,586 A | 5/1990 | Nagamatsu | |
| 4,999,946 A | 3/1991 | DeGigiglio et al. | |
| 5,022,183 A | 6/1991 | Bohlmann | |
| 5,022,783 A | 6/1991 | Bohlmann | |
| 5,111,627 A | 5/1992 | Brown | |
| 5,161,710 A | 11/1992 | Chumley | |
| 5,187,894 A | 2/1993 | Ripley, Sr. et al. | |
| 5,189,834 A * | 3/1993 | Green | A01G 27/04 47/62 C |
| 5,281,185 A | 1/1994 | Lee | |
| 5,281,459 A | 1/1994 | Van Eijck | |
| 5,309,846 A | 5/1994 | Peterson | |
| 5,315,786 A | 5/1994 | Peterson | |
| 5,419,080 A * | 5/1995 | Buss | A01G 9/0295 47/87 |
| RE35,006 E | 8/1995 | Ripley et al. | |
| 5,437,698 A | 8/1995 | Furukawa | |
| 5,467,555 A | 11/1995 | Ripley, Sr. et al. | |
| 5,519,080 A | 5/1996 | Matsushita et al. | |
| 5,581,936 A | 12/1996 | Belgiomo | |
| 5,585,150 A | 12/1996 | Sheehan | |
| 5,595,021 A | 1/1997 | Ripley, Sr. et al. | |
| 5,673,513 A | 10/1997 | Casimaty | |
| 5,953,859 A | 9/1999 | Cochran et al. | |
| 6,178,690 B1 | 1/2001 | Yosida et al. | |
| 6,237,285 B1 | 5/2001 | Yoshida et al. | |
| 6,460,301 B1 | 10/2002 | McKee | |
| 6,536,361 B1 | 3/2003 | Wu | |
| 6,581,329 B1 | 6/2003 | Eriksson | |
| 6,606,823 B1 | 8/2003 | McDonough et al. | |
| 6,655,103 B1 | 12/2003 | Lueghamer | |
| 6,694,672 B1 | 2/2004 | Hergeth | |
| 6,711,851 B2 | 3/2004 | Mischo | |
| 6,862,842 B2 | 3/2005 | Mischo | |
| 6,904,716 B2 | 6/2005 | Weder et al. | |
| 6,911,248 B2 | 6/2005 | Sabatini | |
| 7,344,334 B2 | 3/2008 | Thorkelson | |
| 7,387,823 B2 | 6/2008 | Waterford | |
| 7,392,616 B1 * | 7/2008 | Bagby | A01G 27/04 47/33 |
| 7,603,808 B2 | 10/2009 | Carpenter | |
| 8,516,743 B1 * | 8/2013 | Giacomantonio | A01G 9/022 47/62 A |
| 8,966,817 B2 * | 3/2015 | Cronk | A01G 9/033 47/65.5 |
| 2002/0007591 A1 | 1/2002 | Mischo | |
| 2004/0040209 A1 | 3/2004 | Layt et al. | |
| 2004/0081771 A1 | 4/2004 | Waterford | |
| 2005/0102921 A1 | 5/2005 | Mischo | |
| 2005/0155287 A1 | 7/2005 | Phillips | |
| 2007/0094927 A1 | 5/2007 | Perry | |
| 2007/0261299 A1 | 11/2007 | Kephart | |
| 2008/0092441 A1 | 4/2008 | St. Clair et al. | |
| 2008/0168710 A1 | 7/2008 | MacKenzie | |
| 2009/0320364 A1 | 12/2009 | MacKenzie | |
| 2011/0030274 A1 * | 2/2011 | Buist | A01G 9/033 47/65.9 |
| 2011/0289839 A1 * | 12/2011 | Cronk | A01G 9/033 47/65.9 |
| 2012/0227319 A1 | 9/2012 | Jaslow | |
| 2012/0240463 A1 | 9/2012 | Bindschedler et al. | |
| 2012/0266537 A1 | 10/2012 | MacKenzie | |

FOREIGN PATENT DOCUMENTS

| | | | |
|---|---|---|---|
| EP | 1306485 | 2/2003 | |
| EP | 3643162 A1 * | 4/2020 | A01G 27/04 |
| FR | 2703213 | 10/1994 | |
| GB | 399175 | 2/1933 | |
| GB | 882951 | 10/1960 | |
| GB | 2074433 | 11/1981 | |
| GB | 2138690 | 10/1985 | |
| GB | 2157534 | 10/1985 | |
| JP | 11155369 | 6/1999 | |
| KR | 102048147 B1 | 11/2019 | |

* cited by examiner

MODULAR PLANTING SYSTEM FOR ROOF APPLICATIONS

CROSS REFERENCE TO RELATED APPLICATION

This application claims benefit to U.S. Provisional Patent Application No. 63/155,556, filed Mar. 2, 2021, entitled "MODULAR PLANTING SYSTEM FOR ROOF APPLICATIONS," the entire disclosure of which is incorporated herein.

BACKGROUND OF THE INVENTION

The present invention relates to a modular planting system for roof applications, and in particular to a modular planting system that includes a plurality of planter modules each including a planter and an optional collar member extending upwardly from an uppermost portion of the planter, thereby allowing plant matter to extend above the upper edge of the associated planter and the collar, a basin configured to store a fluid such as water therein, and a fluid wicking member providing fluid communication between the basin and the planter, thereby creating a green-roof system configured to supply water to the plant matter in an efficient and economical manner during times of short water supply.

A planted roof system is desired that provides adequate roof coverage quickly and economically, while simultaneously being easy to install at a relative low cost, and that is configured to optimize the use of water available to plant matter supported within the planted roof system.

SUMMARY OF THE INVENTION

One aspect of the embodiments disclosed herein includes a green roof planter module that includes a planter including a bottom wall and a plurality of side walls that cooperate with one another to define an interior space configured to receive an aggregate and plant matter therein, the bottom wall including at least one aperture extending therethrough, a basin including a bottom wall and a plurality of side walls, wherein the bottom wall of the basin and the side walls of the basin cooperate to define a fluid retention space, wherein the planter is supported above the basin, and a fluid wicking member providing fluid communication from the fluid retention space of the basin to the at least one aperture of the bottom wall of the planter, such that the fluid wicking member is configured to transfer fluid from the fluid retention space of the basin to the aggregate and plant matter located with the interior space of the planter Another aspect of the embodiments disclosed herein may alternatively or additionally include a green roof planter module that includes a planter including a bottom wall and a plurality of side walls that cooperate with one another to define an interior space configured to receive an aggregate and plant matter therein, the bottom wall including at least one aperture extending therethrough, a basin including a bottom wall and a plurality of side walls, wherein the bottom wall of the basin and the side walls of the basin cooperate to define a fluid retention space, wherein the planter is supported above and abuts the basin, and wherein the basin includes at least one boss extending upwardly from the bottom wall of the basin and that includes a top surface that is located proximate the bottom wall of the planter, and a fluid wicking member comprising a sheet of interwoven fiber mesh, wherein the fluid wicking member is located between the top surface of the at least one boss and the bottom wall of the planter, the fluid wicking member providing fluid communication from the fluid retention space of the basin to the at least one aperture of the bottom wall of the planter, such that the fluid wicking member is configured to transfer fluid from the fluid retention space of the basin to the aggregate and plant matter located with the interior space of the planter, and wherein the fiber mesh comprises polyester and polyamide.

Yet another aspect of the embodiments disclosed herein may alternatively or additionally include a method for installing a modular green roof system that includes providing a first basin including a bottom wall and a plurality of side walls, wherein the bottom wall of the basin and the side walls of the basin cooperate to define a fluid retention space, placing the first basin on a roof surface, providing a fluid wicking member, and placing the fluid wicking member into the interior fluid retention space of the first basin. The method may additionally include providing a first planter including a bottom wall and a plurality of side walls that cooperate with one another to define an interior space configured to receive an aggregate and plant matter therein, the bottom wall including at least one aperture extending therethrough, and placing the first planter over the first basin such that the wicking member is configured to provide fluid communication and transfer fluid from the fluid retention space of the basin to the at least one aperture of the bottom wall of the planter.

The present inventive green roof system provides coverage of an entire roof area quickly and economically, and is configured to optimize use of water available via rainfall and/or water supply systems, while minimizing runoff, and by allowing the associated modules to be grown off-sight in a manner that allows the plant matter to extend upwardly from an associated planter and plant matter within adjacent modules to abut immediately upon installation. Further, the roof system is easy to install at a relatively low cost. Moreover, the system provides improved water communication and drainage between adjacent modules, allows easy maintenance of the overall system, can be installed easily and quickly by even unskilled personnel, is capable of a long-operating life, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 8A.

DETAILED DESCRIPTION OF THE PREFERRED EMBODIMENTS

Figure 2:
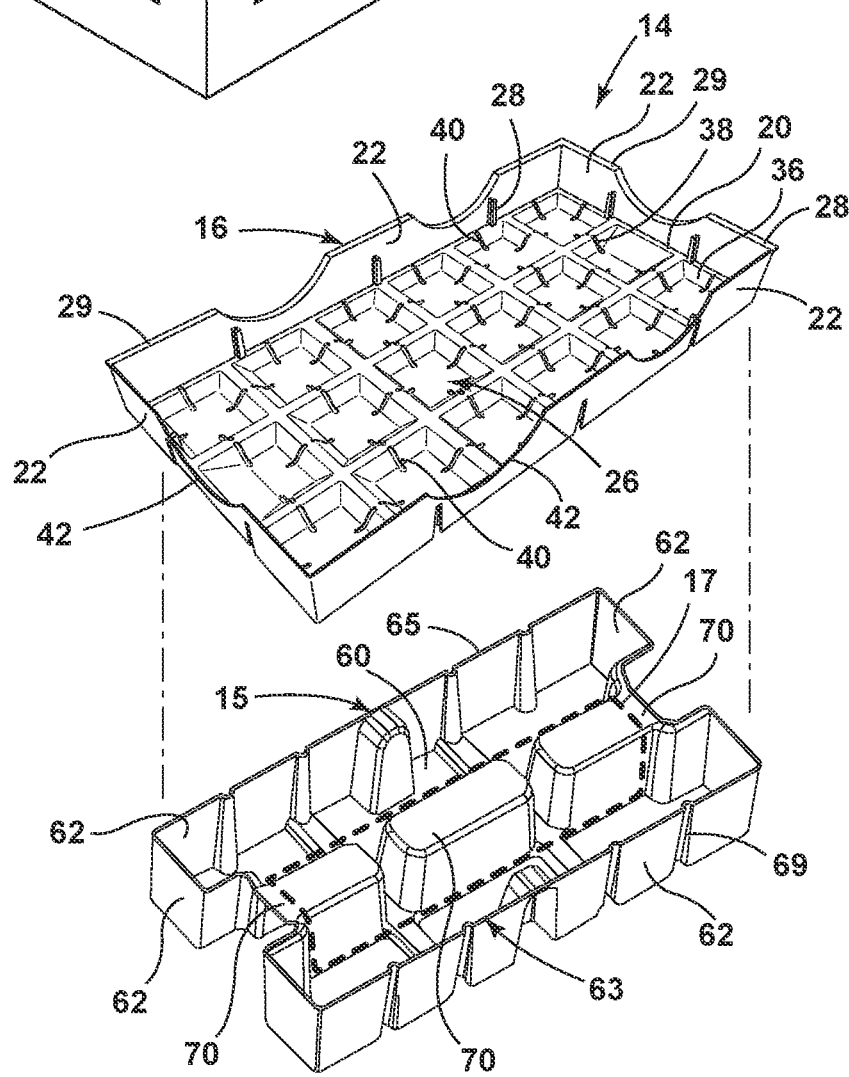
FIG. 2 is an exploded perspective view of a planter module including a planter, and a basin supporting the planter of the planter module.

For purposes of description herein, the terms "upper," "lower," "right," "left," "rear," "front," "vertical," "horizontal," and derivatives thereof shall relate to the invention as oriented in FIG. 2. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIGS. 1 and 2) generally designates a green roof system embodying the present invention and employed on a building roof 12 and comprising a plurality of individual green roof planter modules 14 supported by a plurality of individual basins 15 configured to store fluid such as water therein, and a fluid wicking member 17 providing fluid communication between the basin 15 and the planter module 14, as described below. In the illustrated example, each of the planter modules 14 includes a planter 16 that is supported above and abuts a corresponding basin 15.

Each planter 16 includes a bottom wall 20, a plurality of side walls 22 that cooperate with the bottom wall 20 to form an interior space 26 configured to support aggregate 21 (FIG. 3) and plant matter 23 therein, where the aggregate 21 and plant matter 23 may be placed within the interior space 26 and the plant matter or plants 23 is grown within the interior space 26 prior to installation of the green roof system 10. Each planter 16 may include a plurality of support tabs 28 spaced about the interior space 26 and that extend inwardly toward the interior space 26. Each of the side walls 22 include a top edge 25 (FIGS. 4A and 4B). Each of the optional support tabs 28 may extend upwardly from the bottom wall 20 and may be spaced from an associated side wall 22. The planter 16 is preferably integrally molded by press forming, and the like, and is constructed of a material such as plastic. In the illustrated example, the planter 16 is providing a rectangularly-shaped overall plan form, however, other configurations may also be utilized. Further, it is noted that the tabs 28 may be configured to abut the bottom surface of the bottom wall 20 of another planter 16 when multiple planters are placed in a stacked relationship. As illustrated, one or more of the side walls 22 may include an outwardly-extending overlap tab 29 that overlaps a respective side wall or end wall of an adjacent planter 16.

Each planter module 14 (FIGS. 4A and 4B) may include a collar member 18 includes a plurality of walls 30 each having a bottom edge 32 and a top edge 34. In the illustrated example, the collar member 18 comprises two pieces that may extend in a rectangular manner about the planter 16. Specifically, the collar member 18 may extend about the interior space 26 of the associated planter 16 such that the bottom edge 32 of each of the walls 30 is inserted between the side walls 22 of the planter 16 and the associated support tabs 28, thereby retaining the collar member 18 within the interior space 26 of the planter 16, and such that the walls 30 of the collar member 18 extend upwardly from the top edge 25 of the side walls 22 of the planter 16. Although locking tabs 35 are illustrated between each of the pieces of the collar 18, overlapping, non-tabbed ends may also be utilized.

Figure 1:
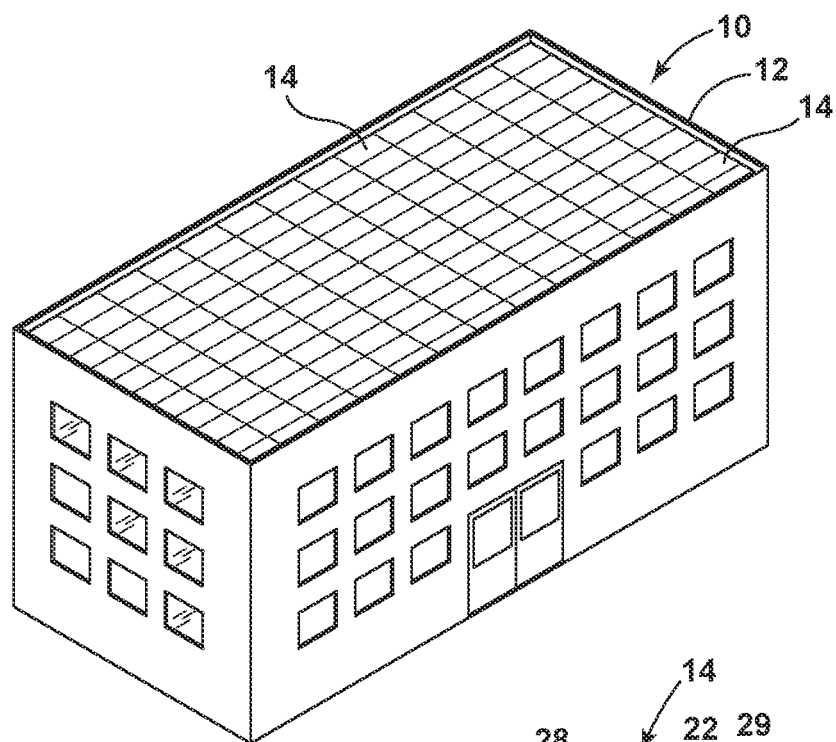
FIG. 1 is a perspective view of a building employing a green roof system embodying the present invention.

In operation, the collar member 18 may be inserted into the interior space 26 of planter 16, in a manner described above, and the plant matter 23 that comprises grown plants, plant seedlings, plant seeds and the like, and the soil and/or aggregate 21 may be inserted into the interior space 26 of the planter 16. Plants may be grown within the interior space 26 until such plant matter extends upwardly above the top edge 25 of the side walls 22 of the planter 16. The planter module 14, either with or without the collar 18, is then placed in rows or a grid work-like pattern upon a roof 12 (FIG. 1). The collar member 18, if provided, may then be removed such that the plant matter 23 within the interior space 26 of the planter 16 abuts similar plant matter in adjacent planter modules 14, thereby providing a connected roof system that will quickly provide an interconnected and aesthetically-pleasing planted surface. Alternatively, the collar member 18 may comprise a biodegradable material that may be left within the planter 16 placed within the overall grid work of the green roof system 10. It is also noted that the walls 30 of the collar member 18 may angle outwardly from the side walls 22 of the planter 16, thereby promoting a tight abutment of the plant matter 21 extending above the top edge 25 of the side walls 22 between adjacent planter modules 14.

The proper communication of water between adjacent planters 16 is provided by various elements within the planter 16. As best illustrated in FIG. 2, the bottom wall 20 of the planter 16 comprises a grid work-like pattern of recesses 36 segmented by raised portions 38. A plurality of drainage or fluid communication apertures 40 extend through the recesses 36 and the raised portions 38. It is noted that at least a portion of each of the drainage apertures 40 extend through a lowermost portion of the bottom wall 20, thereby eliminating standing water within the planter 16. Each of the side walls 22 of the planter 16 also include arcuately-shaped recesses or apertures 42 extending therethrough that align with similar apertures of adjacent planters when positioned within the overall gridwork. As illustrated, each of the apertures 42 extends downwardly from the top edge 25 of the side walls 22, and is configured to providing adequate water communication between adjacent planters 16 and further allowing for the migration of plant matter therebetween.

Figure 3:
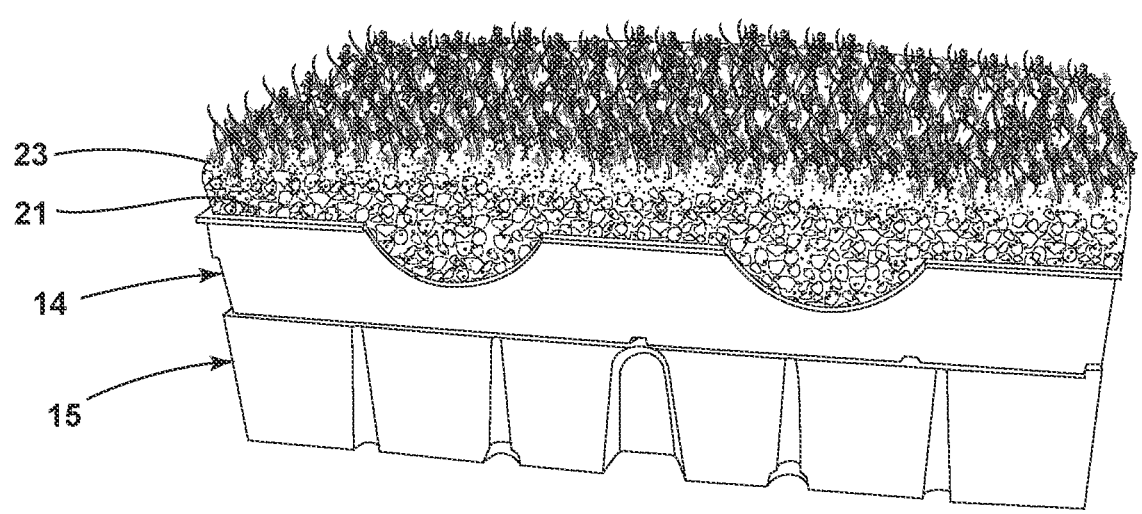
FIG. 3 is a perspective view of the planter housing aggregate and plant matter, where the planter is supported by the basin.
Figure 4A:
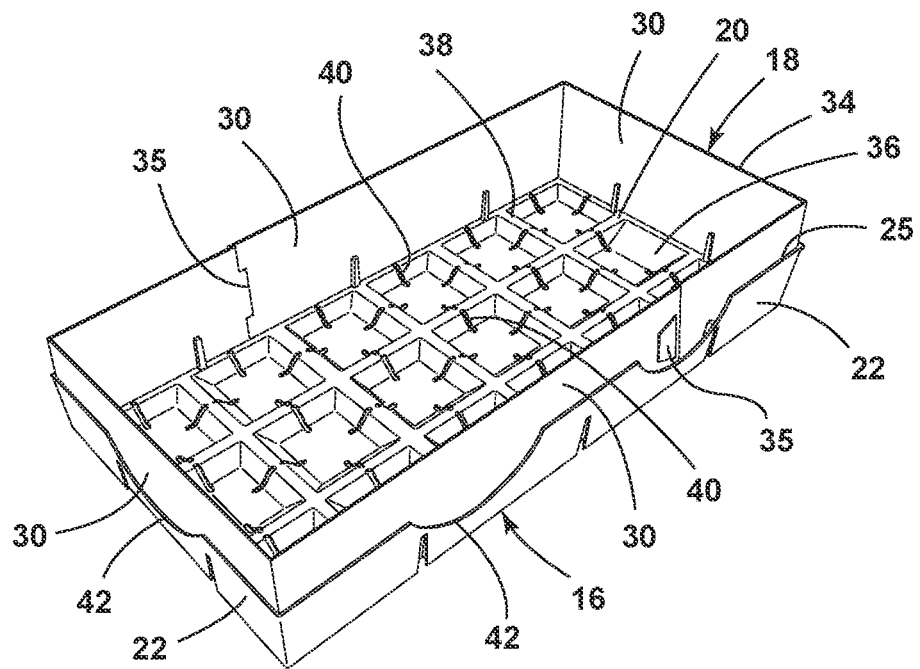
FIG. 4A is a perspective view of an alternative embodiment of the planter module including a collar.
Figure 4B:
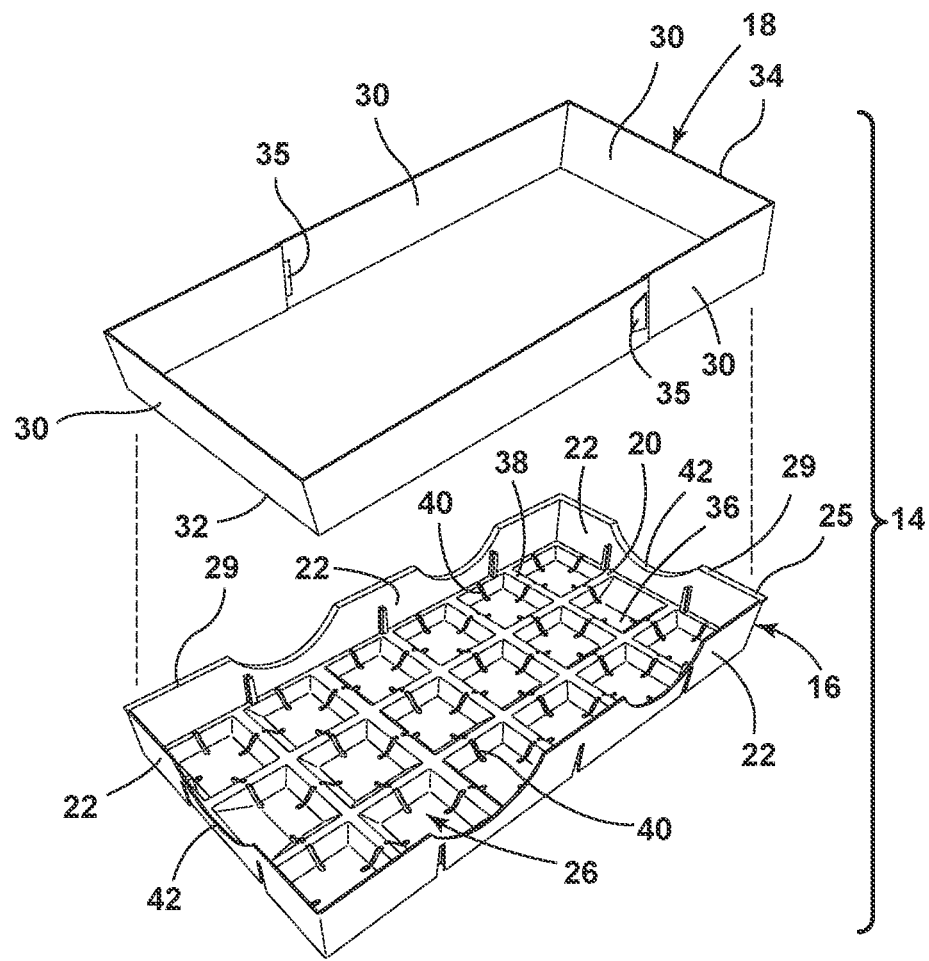
FIG. 4B is an exploded perspective view of the alternative planter module including the planter and the collar.

As best illustrated in FIGS. 2 and 3, the basin 15 is provided substantially the same plan form shape as the planter 16 and includes a bottom wall 60 and a plurality of side walls 62 that cooperate to define an interior space or water/fluid retention space 63, where each of the side walls 62 includes a top edge 65, and a support section 69 extending inwardly from and spaced along a length of the side walls 62, where the support sections 69 are configured to structurally reinforce the side walls 62 and support the associated planter 14 thereabove. Each basin 15 further includes a plurality of bosses 70 that extend upwardly from the bottom wall 60, and such that a top surface 72 of at least one of the bosses 70 is positioned proximate the bottom wall 20 of the planter 16 supported by the basin 15. The basin 15 is preferably integrally molded by press forming, and the like, and is constructed of a material such as plastic.

Figure 5:
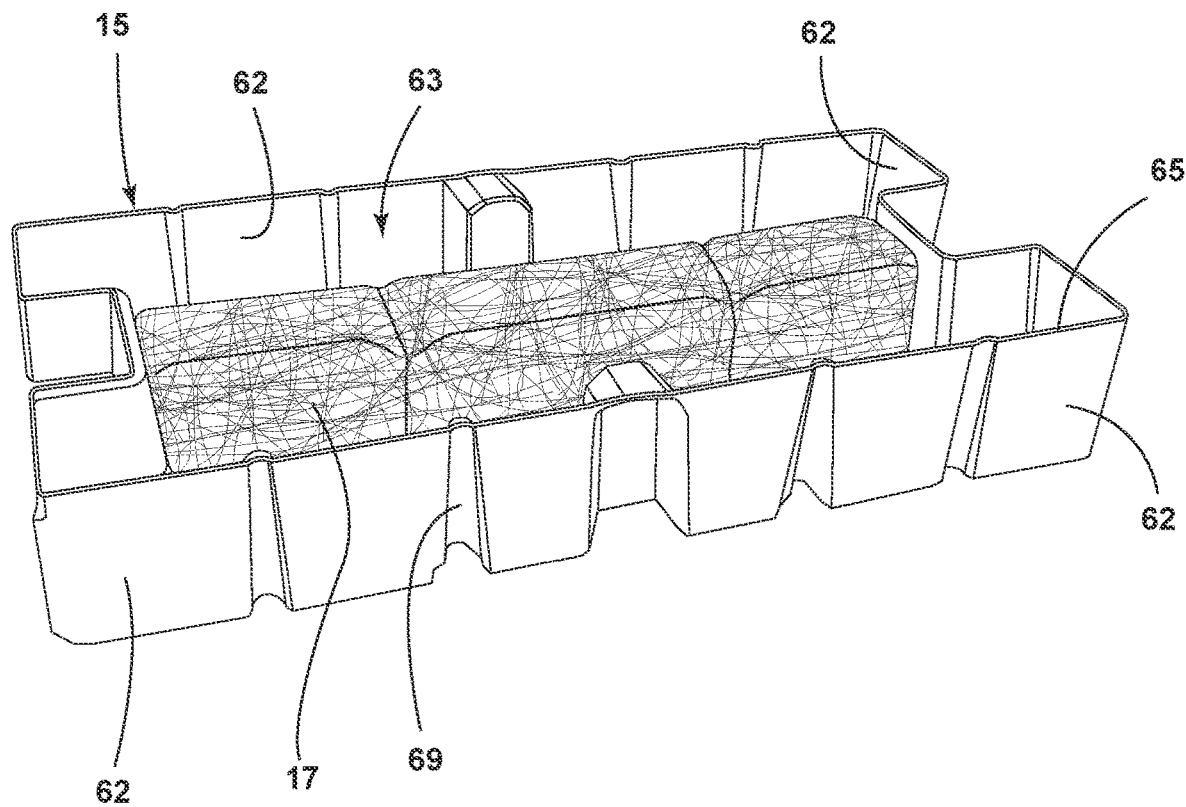
FIG. 5 is a top perspective view of the basin and a fluid wicking member.
Figure 6:
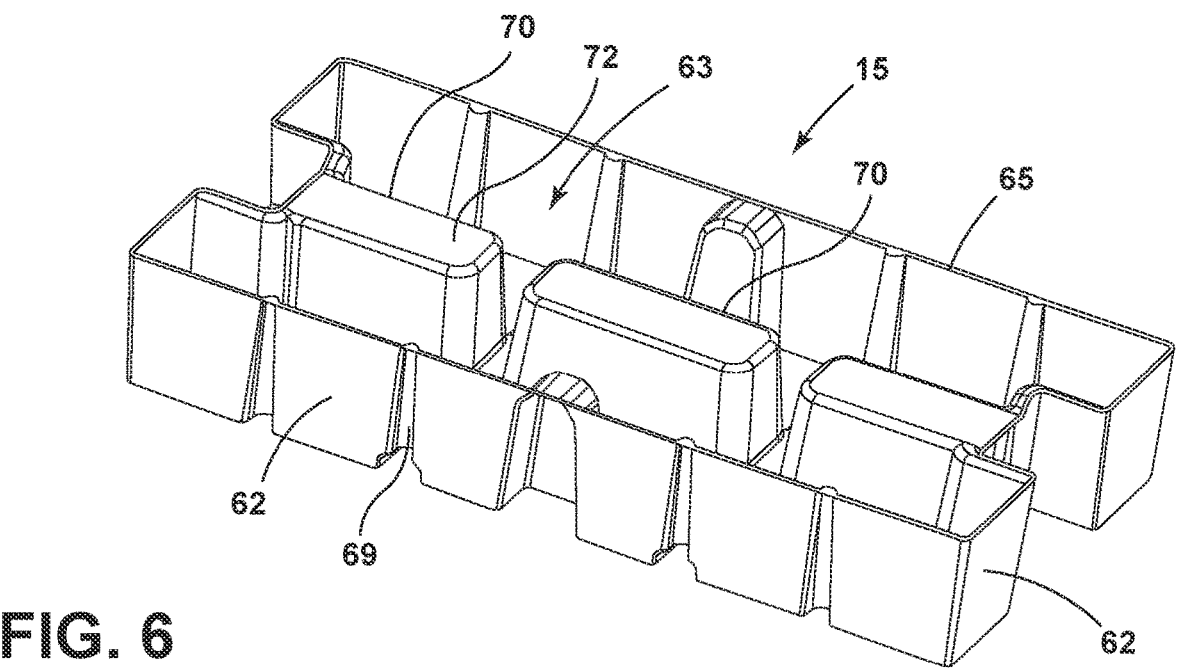
FIG. 6 is a top perspective view of the basin.
Figure 7:
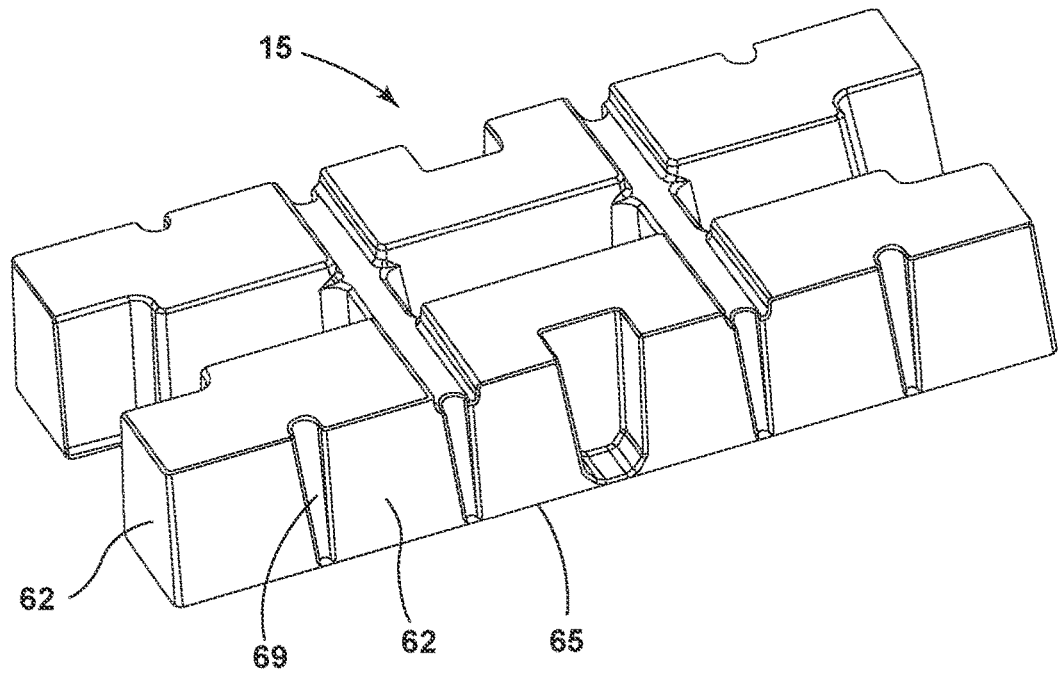
FIG. 7 is a bottom perspective view of the basin.
Figure 8C:
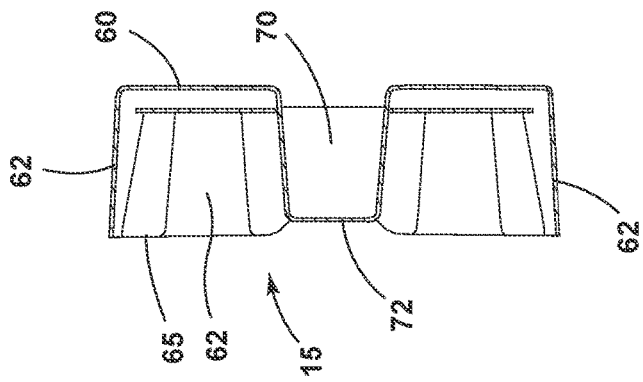
FIG. 8C is a cross-sectional end elevational view of the planter taken along the line VIIIC-VIIIC.
Figure 8A:
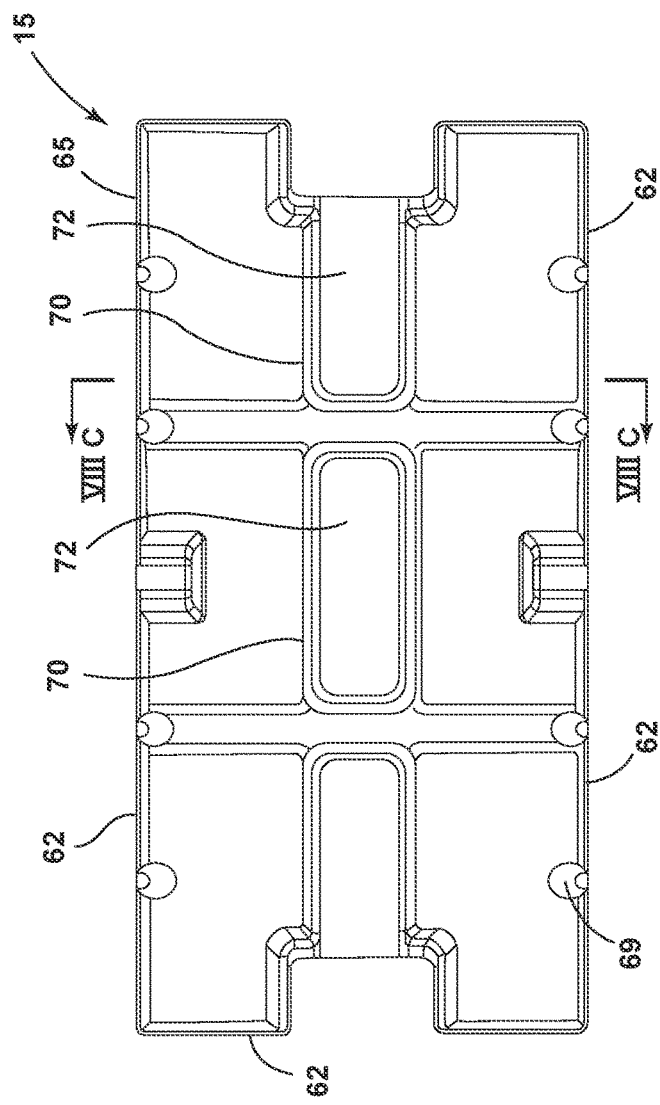
FIG. 8A is a top plan view of the basin.
Figure 8B:
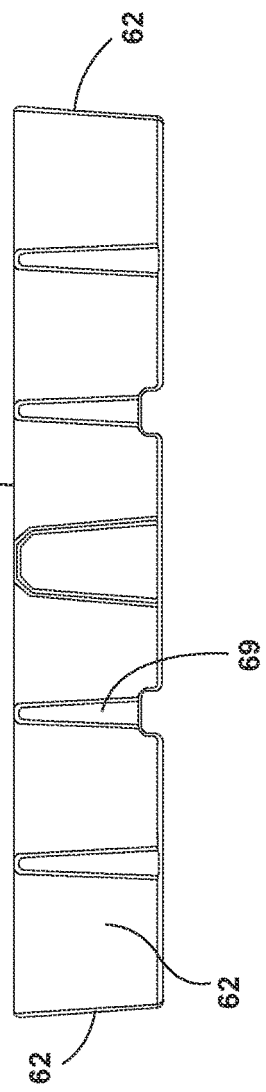
FIG. 8B is a side elevational view of the basin.

As best illustrated in FIG. 5, the fluid wicking member 17 comprises a flexible sheet comprised of a fluid wicking material configured to wick fluids, such as water, contained within the fluid retention space 63 of the basin 15, vertically upwards from the fluid retention space 63 to the apertures 40 within the bottom wall 20 of the planter 14 such that the fluid may be absorbed by the aggregate 21 or water absorbing organic or inorganic components within the aggregate or by the roots of the plant matter 23 located within the interior space 26 of the planter 14. Preferably, the fluid wicking member 17 comprises an interwoven plurality of fibers comprising polyethylene or polyester or, more preferably comprising polyester and polyamide, and most preferably comprising about 80% polyester and about 20% polyamide. As best illustrated in FIG. 5, the fluid wicking member 17 is positioned within the fluid retention space 63 of the basin 15 such that a portion of the fluid wicking member 17 is located between the top surface of each of the bosses 70 and the bottom wall 20 of the planter 16, such that the fluid wicking material 17 is in fluid communication with the apertures 40, and such that a majority of the surface area and volume of the fluid wicking material 17 is vertically oriented.

In the foregoing description, it will be readily appreciated by those skilled in the art, that modifications may be made to the invention without departing from the concepts as disclosed herein, such modifications are to be considered as included in the following claims, unless these claims by their language expressly state otherwise.

The invention claimed is:

1. A green roof planter module, comprising:
a planter including a bottom wall and a plurality of side walls that cooperate with one another to define an interior space configured to receive an aggregate and plant matter therein, the bottom wall including at least one aperture extending therethrough;
a basin including a bottom wall and a plurality of side walk, wherein the bottom wall of the basin and the side walk of the basin cooperate to define a fluid retention space, wherein the planter is supported above the basin; and
a fluid wicking member providing fluid communication from the fluid retention space of the basin to the at least one aperture of the bottom wall of the planter, such that the fluid wicking member is configured to transfer fluid from the fluid retention space of the basin to the aggregate and plant matter located with the interior space of the planter, wherein the fluid wicking member includes an exposed first surface, a second surface opposite the first surface and abutting the basin, and a peripheral edge, and wherein a majority of a surface area of the exposed first surface is vertically oriented.

2. The green roof planter module of claim 1, wherein the fluid wicking member comprises a sheet.

3. The green roof planter module of claim 1, wherein the basin includes at least one boss extending upwardly from the bottom wall of the basin and that includes a top surface that is located proximate the bottom wall of the planter, and wherein the fluid wicking member is located between the top surface of the at least one boss and the bottom wall of the planter.

4. The green roof planter module of claim 1, wherein the basin abuts the planter.

5. The green roof planter module of claim 1, wherein the fluid wicking member comprises an interwoven fiber mesh.

6. The green roof planter module of claim 1, wherein the fluid wicking member comprises polyester.

7. The green roof planter module of claim 1, wherein the fluid wicking member comprises polyester and polyamide.

8. The green roof planter module of claim 1, wherein the fluid wicking member comprises about 80% polyester and about 20% polyamide.

9. The green roof planter module of claim 1, wherein the fluid wicking member comprises polyethylene.

10. A green roof system, comprising:
at least four of the planters of claim 1; and
at least four of the basins of claim 1;
wherein one of the least four planters abuts each of a remaining three of the four planters.

11. A green roof planter module, comprising:
a planter including a bottom wall and a plurality of side walls that cooperate with one another to define an interior space configured to receive an aggregate and plant matter therein, the bottom wall including at least one aperture extending therethrough;
a basin including a bottom wall and a plurality of side walls, wherein the bottom wall of the basin and the side walls of the basin cooperate to define a fluid retention space, wherein the planter is supported above and abuts the basin, and wherein the basin includes at least one boss extending upwardly from the bottom wall of the basin and that includes a top surface that is located proximate the bottom wall of the planter; and
a fluid wicking member comprising a sheet of interwoven fiber mesh, wherein the fluid wicking member is located between the top surface of the at least one boss and the bottom wall of the planter, the fluid wicking member providing fluid communication from the fluid retention space of the basin to the at least one aperture of the bottom wall of the planter, such that the fluid wicking member is configured to transfer fluid from the fluid retention space of the basin to the aggregate and plant matter located with the interior space of the planter, and wherein the fiber mesh comprises polyester and polyimide.

12. The green roof planter module of claim 11, wherein the fluid wicking member comprises about 80% polyester and about 20% polyamide.

13. The green roof planter module of claim 11, wherein the fluid wicking member comprises polyethylene.

14. The green roof planter module of claim 11, wherein the fluid wicking member includes an exposed first surface, a second surface opposite the first surface and abutting the basin, and a peripheral edge, and wherein a majority of a surface area of the first surface of the fluid wicking member is vertically oriented.

15. The green roof planter module of claim 11, wherein the at least one aperture includes a plurality of apertures.

16. A method for installing a modular green roof system, comprising:
providing a first basin including a bottom wall and a plurality of side walls, wherein the bottom wall of the basin and the side walls of the basin cooperate to define a fluid retention space;
placing the first basin on a roof surface;
providing a fluid wicking member;
placing the fluid wicking member into the interior fluid retention space of the first basin;
providing a first planter including a bottom wall and a plurality of side walls that cooperate with one another to define an interior space having an aggregate and plant matter located therein, the bottom wall including at least one aperture extending therethrough; and
placing the first planter over the first basin such that the wicking member is configured to provide fluid communication and transfer fluid from the fluid retention space of the basin to the at least one aperture of the bottom wall of the planter;

wherein the fluid wicking member includes an exposed first surface, a second surface opposite the first surface and abutting the basin, and a peripheral edge, and wherein a majority of a surface area of the first surface of the wicking member is vertically oriented subsequent to placing the fluid wicking member into the interior fluid retention space of the first basin.

17. The method of claim 16, wherein the fluid wicking member comprises a sheet.

18. The method of claim 16, wherein the basin includes at least one boss extending upwardly from the bottom wall of the first basin and that includes a top surface that is located proximate the bottom wall of the first planter, and wherein placing the fluid wicking member into the interior fluid retention space of the first basin includes locating the fluid wicking member between the top surface of the at least one boss and the bottom wall of the first planter.

19. The method of claim 16, further comprising:
providing a second basin and a second planter, a third basin and a third planter, and a fourth basin and a third planter, that are the same as the first basin and the first planter as defined in claim 16, respectively; and
placing the first, second and third basin on the roof surface, such that the second, third and fourth planters each abut the first planter.

20. The method of claim 16, further comprising:
placing the aggregate and the plant material within the interior space of the first plant prior to placing the first planter over the first basin.

* * * * *

UNITED STATES PATENT AND TRADEMARK OFFICE
CERTIFICATE OF CORRECTION

PATENT NO. : 12,010,961 B2
APPLICATION NO. : 17/652206
DATED : June 18, 2024
INVENTOR(S) : David S. MacKenzie It is certified that error appears in the above-identified patent and that said Letters Patent is hereby corrected as shown below:

In the Specification

Column 1, Line 51:
After "planter" insert -- . --

Column 2, Line 33:
"off-sight" should be — off-site —

Column 3, Line 33:
"is" should be — are —

Column 3, Line 58:
After "18" insert -- and --

Column 4, Line 45:
"providing" should be — provide —

In the Claims

Column 5, Claim 1, Lines 36, 37:
"walk" should be — walls —

Column 6, Claim 10, Line 9:
After "the" insert -- at --

Column 6, Claim 11, Line 34:
"with" should be — within —

Signed and Sealed this
Twenty-ninth Day of October, 2024

Katherine Kelly Vidal
*Director of the United States Patent and Trademark Office*

Column 7, Claim 19, Line 22 (2nd occurrence):
"third" should be — fourth —

Column 7, Claim 19, Line 25:
"basin" should be — basins —